United States Patent [19]
Courtade et al.

[11] 3,928,620
[45] Dec. 23, 1975

[54] PRESERVATION OF AGRICULTURAL PRODUCTS

[75] Inventors: Michel Armand Christian Courtade, Le Vesinet; Bernard Raymond Pierre Ferveur, Ermont, both of France

[73] Assignee: The British Petroleum Company Limited, London, England

[22] Filed: July 3, 1974

[21] Appl. No.: 485,619

[30] Foreign Application Priority Data
July 3, 1973  France .............................. 73.24373

[52] U.S. Cl. ................ 424/317; 424/196; 424/355; 426/335; 246/532

[51] Int. Cl.$^2$ ... A23K 3/03; A23L 3/34; A01N 9/04
[58] Field of Search.................... 424/196, 317, 424; 426/335, 532

[56] References Cited
UNITED STATES PATENTS
2,258,291   10/1941   Jones .................................. 424/317

*Primary Examiner*—Donald B. Moyer
*Attorney, Agent, or Firm*—Morgan, Finnegan, Pine, Foley & Lee

[57] ABSTRACT

The use of propionic acid for treating stored agricultural plant products can be enhanced by adding a hydrocarbon mineral oil to the propionic acid.

4 Claims, No Drawings

PRESERVATION OF AGRICULTURAL PRODUCTS

The present invention relates to a composition and process for preserving agricultural plant products during storage by reduction in the risk of contamination by micro-organisms.

In the storage of agricultural plant products which are to be used as a feed material or in industrial materials e.g. in the making of fibre board, there is always the risk of attack by micro-organisms such as yeasts, fungi or bacteria. The result of such attack is a reduction in the quality of the plant material and the possibility of the material being rendered unusable.

The speed of growth of these micro-organisms depends on several factors, in particular the ambient temperature, the moisture content of the plant material and the presence of oxygen.

Physical methods which have been used to preserve stored plant material have included drying to reduce the moisture content, storing under a vacuum or under an atmosphere of nitrogen or carbon dioxide to avoid the presence of oxygen and refrigeration to maintain a low temperature.

These physical methods can suffer from various disadvantages such as difficulty of operation and high costs.

Chemical methods have also been used to preserve stored agricultural plant material, such as spraying the stored material with propionic acid or acid mixtures containing propionic acid.

We have now discovered that mixing propionic acid with an oil can increase the effectiveness of the propionic acid.

According to the invention there is provided a composition for treating agricultural plant products which are to be stored, which composition comprises propionic acid and a hydrocarbon mineral oil.

The invention also provides a method for treating agricultural plant products, which method comprises contacting the plant products with a composition comprising propionic acid and a hydrocarbon mineral oil.

The mineral oil is preferably a paraffinic oil obtained by the distillation of petroleum. The oil preferably falls within the following specification.

| Property | Methods of Measurement |
|---|---|
| Density at 150°C = 0.830 to 1.025 | NFT 60-101 |
| Kinematic Viscosity at 50°C = 8 to 600 cst. | NFT 60-100 |
| Pensky Flash Point °C = 180 to 300 | NFM 07-019 |
| Aniline Point °C = −5 to +120 | NFM 07-021 |

The composition preferably comprises 5 to 80 percent by weight of the oil and 95 to 20 percent by weight of propionic acid, more preferably the composition comprises 30 to 60 percent by weight of the oil and 70 to 40 percent by weight of propionic acid.

The propionic acid can optionally be mixed with other carboxylic acids such as formic acid and acetic acid. Suitable mixed acid compositions include acid mixtures disclosed in U.K. Pat. No. 1,160,430.

The mixture of propionic acid and hydrocarbon mineral oil is preferably contacted with the agricultural plant product to be treated in an amount of 0.1 to 10 percent by weight of the agricultural plant product to be treated, more preferably in an amount of 1 to 5 percent by weight of the weight of the agricultural plant product to be treated, based on the dry weight of the agricultural plant products.

The invention is further illustrated with reference to the following Examples.

EXAMPLE 1

A mixture of propionic acid and a hydrocarbon mineral oil the properties of which oil fall within the limits given in the specification was formed comprising 50 percent by weight of the propionic acid and 50 percent by weight of the hydrocarbon mineral oil.

Provence canes were cut into lengths of 3 to 5 cm and broken up into 500 grm. lots. Each lot was sprayed at a rate of 4 grams of the spray per 100 grams of cane with:

i. Propionic acid alone
ii. The mixture of propionic acid and oil described above.

The lots were sprayed whilst in a plastic bag and then placed in a second plastic bag. The moisture content of the cane at the time of harvesting was approximately 50 percent by weight.

The bags were placed in an oven at 37°C, the optimun growth temperature for most bacteria.

After 15 days a control lot which had not been treated with liquid had been completely invaded by various fungi (Fusarium, Penicillium Aspergillus) and the Provence cane was unusable for industrial applications. The lots treated with propionic acid and the propionic acid/oil mixture described above were unaffected.

The test was repeated using a spray rate of 2 grams of spray per 100 grams of cane, using as spray liquids propionic acid and a mixture of 50 percent propionic acid and 50 percent by weight mineral oil as described above.

The results of the second test were the same as the first test, the materials treated with propionic acid, and the propionic acid/mineral oil mixture were unaffected, whereas the untreated material was contaminated.

A more prolonged test was carried out in which the Provence cane was treated with propionic acid and a propionic acid/mineral oil mixture as described above at a dosage of 4 grams of the propionic acid or propionic acid/mineral oil mixture per 100 grams of cane. The treated material was stored at 37°C for 1 month and at ambient temperature for 13 months. In both cases no fungal attacks occurred.

EXAMPLE 2

Example 1 was repeated using chestnuts instead of Provence cane. Doses of the propionic acid/mineral oil mixture of 1, 2 and 4 grams per 100 grams of chestnuts, and dosages of propionic acid of 0.5, 1 and 2 grams per 100 grams of chestnuts were used.

Batches of chestnuts were treated and placed in plastic bags as described in Example 1. The batches were stored at 20°C to 25°C (ambient temperature) and compared with untreated material. The results are given in the table below:-

| Dose | Product | Observation |
|------|---------|-------------|
| — | — | Completely invaded from the 8th day. |
| 0.5% | Propionic acid | Appearance of first fungi from 17th day, fungi identical to those appearing on untreated batch. Complete invasion after 3 months. |
| 1% | 50/50 Propionic acid Oil Mixture | Appearance of first fungi after 31st day, complete invasion after 4 months. |
| 1% | Propionic acid | Appearance of first fungi after 3 months, complete invasion after 6 months |
| 2% | 50/50 Propionic acid Oil Mixture | After 6 months the batch is completely free from fungi. |
| 2% | Propionic acid | After 6 months the batch is completely free from fungi. |
| 4% | 50/50 | After 6 months the batch is completely free from fungi. |

It can be seen from the table that the 50/50 mixture of propionic acid and oil is more effective than propionic acid alone at the same dosage of propionic acid.

EXAMPLE 3

Grains of maize harvested with a moisture content of 56 percent by weight were treated with the products and dosages given below:-

| Products | Doses % by weight |
|----------|-------------------|
| Propionic acid | 1, 2, 3, 4 |
| Mineral Oil | 2, 3, 4 |
| 70/30 mixture by weight of oil and Propionic acid | 3, 3, 4 |
| 50/50 mixture by weight of oil and Propionic acid | 2, 3, 4 |
| 30/70 mixture by weight of oil and Propionic acid | 2, 3, 4 |

The grains of maize were placed in unclosed plastic bags and stored under natural shelter under practical agricultural conditions (temperature varying from +3° to +10°C).

After 6 months the batches were inspected, and the following observations made.

A control batch with no treatment was invaded by various fungi (Penicillium, Aspergillus) after 1 month of storage, its deterioration being completed after 3 months.

The batch treated with the oil alone was invated at the same date as the untreated control and was completely invaded after 4 months.

All the other batches were free from any fungal contamination after 6 months.

We claim:

1. A composition for protecting stored plant feed-stuffs against attack by micro-organisms which composition comprises about 5 to 80 percent by weight of a hydrocarbon mineral oil which has a density of 15°C. of 0.830 to 1.025, a Kinematic Viscosity at 50°C. of 8 to 600 centistokes, a Pensky Flash Point of 180° to 300°C. and an aniline point of −5° to +120°C., and about 95 to 20 percent by weight of propionic acid.

2. A composition as claimed in claim 1 in which the said composition consists essentially of 30 to 60 percent by weight of the said hydrocarbon mineral oil and 70 to 40 percent by weight of propionic acid.

3. A method for treating plant feed-stuffs against attack by micro-organisms which method comprises spraying the plant feed-stuffs with an amount of 0.1 to 10 percent by weight based on the dry weight of the feed-stuffs of a composition comprising about 5 to 80 percent by weight of a hydrocarbon mineral oil which has a density at 15°C. of 0.830 to 1.025, a Kinematic Viscosity at 50°C. of 8 to 600 centistokes, a Pensky Flash Point of 180° to 300°C. and an aniline point of −5° to +120°C., and about 95 to 20 percent of propionic acid.

4. A method as claimed in claim 3 in which the plant feed-stuffs are sprayed with 1 to 5 percent by weight, based on the dried weight of the feed-stuffs of the said composition.

* * * * *

UNITED STATES PATENT OFFICE
CERTIFICATE OF CORRECTION

Patent No. 3,928,620  Dated December 23, 1975

Inventor(s) Michel Armand Christian Courtade et al

It is certified that error appears in the above-identified patent and that said Letters Patent are hereby corrected as shown below:

Column 1, line 51, "150°C." should read -- 15°C. --

Signed and Sealed this sixteenth Day of March 1976

[SEAL]

Attest:

RUTH C. MASON
*Attesting Officer*

C. MARSHALL DANN
*Commissioner of Patents and Trademarks*